(12) United States Patent
Vidal Carres (10) Patent No.: US 8,430,611 B2
(45) Date of Patent: Apr. 30, 2013

(54) VERSATILE HAND ROUTER

(75) Inventor: Francisco Vidal Carres, Castellví de Rosanes (ES)

(73) Assignee: Virutex S.A., Barcelona (ES)

( * ) Notice: Subject to any disclaimer, the term of this patent is extended or adjusted under 35 U.S.C. 154(b) by 887 days.

(21) Appl. No.: 12/555,148

(22) Filed: Sep. 8, 2009

(65) Prior Publication Data

US 2010/0132840 A1 Jun. 3, 2010

(30) Foreign Application Priority Data

Dec. 1, 2008 (ES) .................................. 200803407

(51) Int. Cl.
*B23C 1/20* (2006.01)

(52) U.S. Cl.
USPC ........................ 409/182; 409/138; 144/136.95

(58) Field of Classification Search .................. 409/138, 409/139, 140, 175, 178, 180, 181, 182; 408/110, 408/112, 138; 144/48.5, 136.95, 154.5; *B27C 5/10*
See application file for complete search history.

(56) References Cited

U.S. PATENT DOCUMENTS

| 3,312,258 A * | 4/1967 | Spampinato ............... 144/251.2 |
| 3,454,061 A | 7/1969 | Cordone et al. |
| 4,572,715 A * | 2/1986 | Wolff ........................ 144/154.5 |
| 4,655,653 A | 4/1987 | Hall et al. |
| 4,711,799 A | 12/1987 | Gove |
| 7,131,898 B2 * | 11/2006 | Adkins et al. ................. 451/360 |
| 2005/0081954 A1 | 4/2005 | Wielechowski |
| 2006/0032553 A1* | 2/2006 | Williams ................... 144/154.5 |

FOREIGN PATENT DOCUMENTS

| DE | 9417415 | 12/1994 |
| DE | 19626810 A1 | 1/1997 |
| EP | 1238767 | 9/2002 |
| EP | 1741528 | 1/2007 |
| GB | 2375075 A | 11/2002 |

OTHER PUBLICATIONS

DE9417415U EPO Machine Translation—Kraus et al., "Utility Model." Dec. 22, 1994.*

* cited by examiner

*Primary Examiner* — Daniel Howell
*Assistant Examiner* — Michael Vitale
(74) *Attorney, Agent, or Firm* — McGlew and Tuttle, P.C.

(57) ABSTRACT

Versatile hand router comprising a base plate, a motor body attached to a frame and having a milling shaft, vertical supporting-guide means that support frame in a sliding manner, hand gripping means and vertical position locking means. Motor body is attached to frame by a pivoting link and can be locked in an inclined position. The router comprises a side guiding edge for resting against a trim and sliding there along. The router can be used as a surface router and also to route horizontal intersection corners between a worktop and trims and vertical intersection corners between two trims.

20 Claims, 9 Drawing Sheets

VERSATILE HAND ROUTER

FIELD OF THE INVENTION

The invention relates to the field of hand tools, particularly those that are appropriate for shaping and finishing flat furniture elements made from very hard materials, such as kitchen or bathroom worktops made from synthetic mineral materials.

The hand router referred to in this invention is of the surface router type, in other words of the type comprising a base plate suitable for being applied to a flat surface, a motor body attached to a frame and having a milling shaft, supporting-guide means that carry said frame so that it can slide in a vertical direction, orthogonal to the plane of said base plate, hand gripping means and vertical locking means for selectively fixing the vertical position of the frame.

BACKGROUND OF THE INVENTION

There are a wide variety of hand surface router models. Documents EP-1741528-A1 and EP-1238767-A2, for example, illustrate the general configuration of this type of routers.

Supports for conventional hand routers are known, which allow working with the router axis in an inclined position with respect to the flat surface that is to be routed. Document US-2005081954-A1 discloses one of these supports. The support comprises a base plate that rests slidingly on the flat surface and a frame in which a conventional handheld router is removably attached, with it being possible to arrange said frame in an inclined position, keeping the vertical position fixed, to perform longitudinal routing on a plane parallel to said flat surface and with the milling shaft in the inclined position.

These known hand surface routers and the said supports for conventional handheld routers, can be used to shape kitchen or bathroom worktops made from very hard mineral materials, such as for example "CORIAN" (registered trade mark) among others. However, the use of these known routers and supports is limited: although they allow various routing operations to be carried out on the main worktop surface, such as for example making undercuts or etchings in said surface, and also make it possible to shape the outer edges of the worktop, they are not suitable for performing finishings at the intersection point between the worktop and the "trims". In the field of the invention, the term "trim" means the plates that extend the worktop surface in a short vertical section to form the transition between said worktop and a back wall or the side walls, and which are normally made from the same material as the worktop. At the intersection point between the worktop and the trims a radial-shaped finishing is usually applied to prevent sharp edges that are difficult to clean. In order to create this radial-shaped finishing each manufacturer or fitter uses their own solution which, either requires a cumbersome installation that is not very versatile, or is based on using lightweight handheld tools that require great skill on behalf of the worker.

Document DE-9417415U-U1 discloses a support for handheld routers, which makes it possible to arrange and move a conventional handheld router, mounted on said support, to route the horizontal intersection points between the worktop and the trims. This support is made up of a flat plate and a frame, as in said support in document US-2005081954-A1, but with the peculiarity that, on the one hand, the base plate has side guiding edges, mitred with respect to the middle plane where the milling shaft lies, and on the other hand, the frame housing the router has a movement system that is activated by a hand lever and which allows the router to move in the direction of the milling shaft. In order to route a horizontal intersection corner between the worktop and a trim, the user rests one of the side guiding edges of the base plate on the trim, uses said hand lever to adjust the position of the milling cutter in the horizontal intersection corner between the trim and the worktop, and makes the base plate slide along the trim, maintaining said guiding edge resting on the trim.

However, the support for handheld routers disclosed in document DE-9417415U-U1 is applied exclusively to routing the horizontal intersection corners between the worktop and trims, and does not allow routing the vertical intersection corners between two trims.

Therefore there is the need to provide tools that simplify the shaping and finishing processes of kitchen and bathroom worktops made from very hard synthetic materials.

SUMMARY OF THE INVENTION

The aim of the invention is to provide a versatile hand router which makes it possible to perform the actual tasks of a surface router and which can also be used, without the need for cumbersome installations and without resorting to various special tools, for radial-shaped finishing tasks in horizontal intersection corners between the worktop and the trims, and also in the vertical intersection corners between two trims that form a trihedral with the worktop.

This aim is achieved by means of a versatile hand router comprising a base plate suitable to be applied to a flat surface, a motor body attached to a frame and provided with a milling shaft, and hand gripping means, with said motor body being attached to said frame by means of a pivoting link that allows said motor body to pivot with respect to said frame, in a pivoting plane that is orthogonal to said base plate, between a vertical position wherein said milling shaft is orthogonal to the plane of said base plate and at least one inclined position wherein said milling shaft is inclined with respect to the plane of said base plate, with pivoting locking means being provided to selectively fix the inclined position of said motor body, and comprising at least one side guiding edge in an inclined plane with respect to said pivoting plane and which extends in a cantilever arrangement and above said base plate, so that a milling cutter mounted on said milling shaft can lie under said side guiding edge when said motor body is in the inclined position. The hand router according to the invention is characterized in that it comprises supporting-guide means that carry said frame so that, while maintaining an inclined position fixed by said pivoting locking means, said frame can slide in a vertical direction, orthogonal to the plane of said base plate, and vertical locking means that make it possible to selectively fix the vertical position of said frame.

As will be seen later in the detailed description of an embodiment of the invention, this characteristic configuration makes it possible to use the router comfortably as a surface router, and also as a router for corners, able to perform radial-shaped finishings in the intersection corners between the worktop and the trims. When the motor body lies vertically, the router operates like a surface router, whereas when it is in the inclined position, and with the help of the side guiding edge which makes it possible to adequately position the milling cutter with respect to the trim, the router is suitable for performing the said radial-shaped finishings at the intersection corners.

Also, the invention covers a series of preferable characteristics that are the object of subordinate claims and which are explained later in the detailed description of an embodiment of the invention.

Preferably, the hand router according to the invention has two of said side guiding edges formed in a side guiding plate that is fixed solidly to the base plate and has a cantilever with respect to said base plate, with said cantilever forming a dihedral centered in the pivoting plane and orthogonal to the plane of said base plate, so that the sides of said cantilever form said two side guiding edges.

Preferably, the side guiding plate has an inlet that interrupts the apex of the dihedral formed by said cantilever to allow the passage of the milling cutter in the milling shaft when the motor body is in the inclined position.

Preferably, the side guiding plate extends on the top surface of the base plate and has a wide opening to allow the passage of the milling cutter mounted on the milling shaft when the motor body lies vertically.

Preferably, said wide opening is formed as an extension of said inlet, with both forming one and the same opening.

Preferably, the hand router according to the invention comprises hydraulic damping means that apply a return force to the frame which pushes it away from the base plate in the vertical direction, orthogonal to the plane of said base plate.

Preferably, the hand router according to the invention comprises a protective plate that is removably mounted above the side guiding plate, extending at the top the dihedral formed by the cantilever of the side guiding plate, with said protective plate having an apex that covers the end of inlet in the side guiding plate, leaving said inlet partially uncovered to allow the passage of the milling cutter mounted on the milling shaft when the motor body is in the inclined position.

The invention also covers other detailed characteristics illustrated in the detailed description of an embodiment of the invention and in the accompanying figures.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 9:
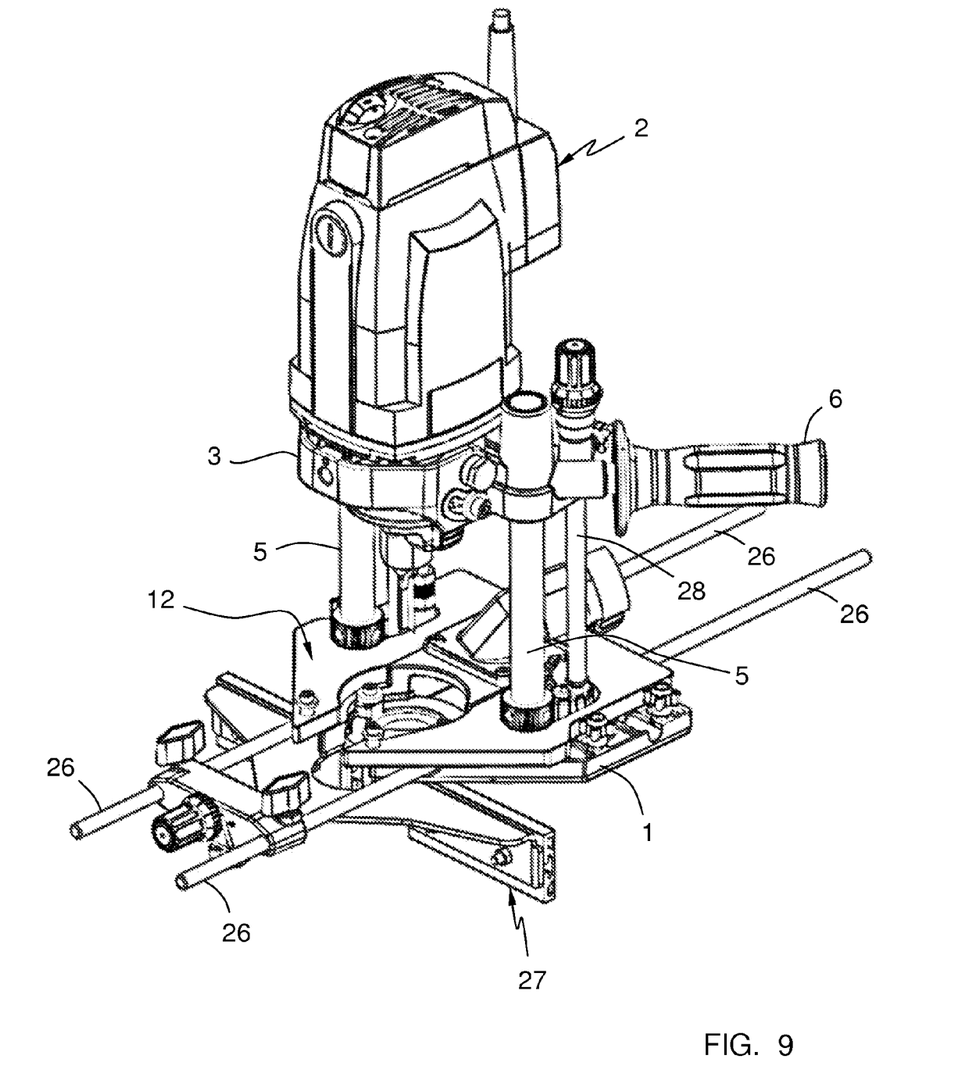
FIG. 9 is a perspective view of the hand router in FIG. 1, with the motor body lying vertically and fitted with means for application to a worktop.

Referring to the drawings in particular, the embodiment described below as a non-limiting example is a 1800 W hand router, with a rotation speed between 11500 and 23000 revolutions per minute, a maximum milling cutter diameter of 61 mm and a milling stroke of up to 100 mm. Its particular design allows two very different applications: with the motor body lying vertically, as shown in FIG. 9, it works like a conventional surface router, with a large milling stroke and ideal conditions for manufacturing and finishing highly worktops made from very hard compound mineral materials, such as for example "CORIAN" (registered trade mark); with the motor body in an inclined position, as shown in FIGS. 1 to 8, it is possible to work on the same worktop to perform radial-shaped finishings in the horizontal and vertical intersection corners like the ones shown in FIGS. 10 and 11.

The router comprises the following basic elements, corresponding to the configuration of a conventional surface router:

a base plate 1 having a lower face forming the router support surface, whereby the router can slide on a flat surface to be worked (in this case, a worktop);

a motor body 2 that activates the milling shaft 4 mounted on the actual motor body 2;

a frame 3 that supports motor body 2 and which in turn is supported by supporting-guide means consisting of two cylindrical vertical bars 5 that are fixed solidly to base plate 1 and which extend perpendicularly thereto, so that the user can slide frame 3, together with motor body 2, in a vertical direction, orthogonal to the plane of said base plate 1;

hand gripping means of frame 3, consisting of two handles 6;

vertical locking means 7, which in this case consist of a tightening mechanism activated by a locking lever 7A and which allow the user to selectively fix the vertical position of frame 3 along bars 5.

Figure 10:
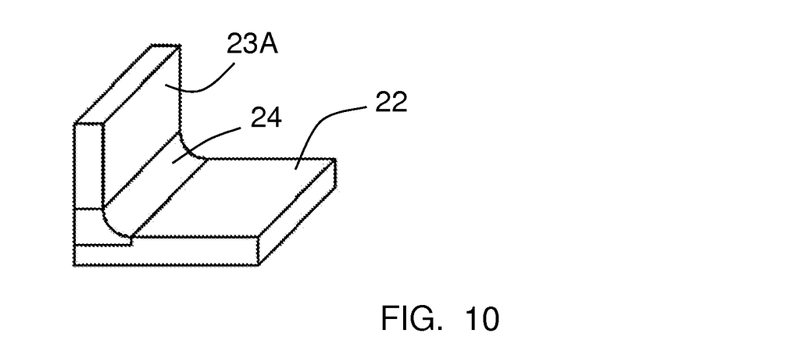
FIG. 10 is a schematic view of a radial-shaped finishing in a horizontal intersection corner between a worktop and a trim.
Figure 11:
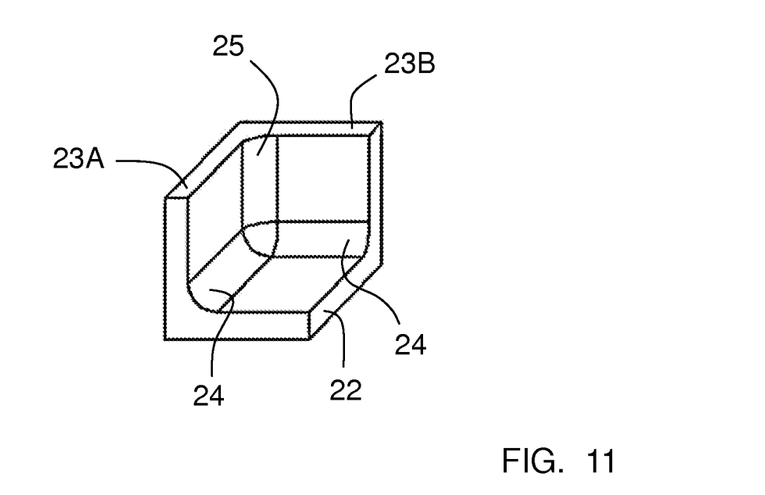
FIG. 11 is a schematic view of a radial-shaped finishing in a vertical intersection corner between two trims that form a trihedral with the worktop.

The particular design of the router according to the invention, by virtue of which it can be used to perform the radial-shaped finishings shown in FIGS. 10 and 11, is based on a combination of characteristics that make it possible to operate motor body 2 in an inclined position and which also makes it possible to suitably adjust the position of the milling cutter 11 with respect to the intersection corner between the worktop and the trim. The first characteristics consists in motor body 2 being attached to frame 3 by a pivoting link 8, and that pivoting locking means are provided, which in this case consist of tightening screws 9 that screw in to motor body 2 and which engage with respective semi-circular grooves 9A formed in frame 3. The user can pivot motor body 2 with respect to frame 3, in a pivoting plane X1 orthogonal to the plane of base plate 1, and selectively fix the pivoting position by acting on tightening screws 9. Motor body 2 can this way move from the vertical position shown in FIG. 9 to the inclined position shown in FIGS. 1 to 8 and remain fixed in these positions. These two extreme positions, respectively with the milling shaft 4 at 90° (vertical position) and at 45° (inclined position) correspond to the end of strokes of tightening screws 9 in grooves 9A, but it is also possible to fix the pivoting position of frame 3 in any intermediate position between these. As will be seen later, with frame 3 fixed in an inclined position a routing operation can be performed along a horizontal intersection corner between the worktop and a trim, while keeping locked the vertical sliding movement of frame 3, and also a routing operation along the vertical intersection corner between two trims by moving frame 3 vertically. The second characteristic consists in arranging a side guiding edge 10 that extends in a cantilever arrangement and above base plate 1, so that milling cutter 11 mounted on milling shaft 4 can be positioned under said side guiding edge 10 when motor body 2 is in the inclined position.

In the illustrated embodiment the router comprises two of said side guiding edges 10 forming between them a right angle centered in pivoting plane X1. Each side guiding edge is therefore comprised in a tilted plane X2 with respect to pivoting plane X1, with planes X1 and X2 forming a 45° angle. This arrangement is achieved by means of guiding plate 12 illustrated in FIG. 4, which attaches to base plate 1 and extends over the top surface thereof, projecting sideways therefrom to form a cantilever. This side guiding plate 12 has a general arrow shape, forming a right angled dihedral which, in the mounted position of side guiding plate 12, remains centered in pivoting plane X1, orthogonal to the plane of base plate 1, and forms said cantilever. The apex of said dihedral is truncated by an inlet 13 that extends opposite to said apex in a wide opening 14, so that inlet 13 and opening 14 form one and the same opening. As can be seen in FIGS. 1, 2, 3 and 5, inlet 13 allows the passage of milling cutter 11 mounted in milling shaft 4 when motor body 2 is in the inclined position, whereas, as can be seen in FIG. 9, when motor body 2 lies vertically the wide opening 14 is aligned vertically with milling shaft 4 to allow the milling cutter 11 to pass. Guiding plate 12 also has two oblong holes 17 which allow the passage of vertical bars 5 and which also make it possible, thanks to their oblong shape, to vary the position of guiding plate 12, and therefore the position of side guiding edges 10 with respect to base plate 1 in the central direction of the dihedral formed by said guiding plate 12, in other words in the horizontal direction comprised in pivoting plane X1. Oblong holes 17 therefore form adjustment means for the relative position of side guiding edges 10 with respect to base plate 1. This relative position is fixed by locking means consisting of respective wing nuts 18 that are mounted in bars 5 and which tighten side guiding plate 12 against base plate 1.

In the illustrated embodiment, the router is fitted with hydraulic damping means that apply a return force to frame 3 that pushes said frame 3 away from base plate 1 in a vertical direction orthogonal to the plane of said base plate 1. These hydraulic damping means are made up of a gas damper with its cylinder 19A fixed solidly to frame 3 and its piston 19B passing through one of the oblong holes 17 in guiding plate 12 and supported on base plate 1.

In the illustrated embodiment, the router also comprises a protective plate 15 that is removably attached above side guiding plate 12 and which is intended to protect the trim from the action of milling cutter 11 when a radial-shaped finishing is being performed on the horizontal corner between the surface and the trim. This protective plate 15, which is shown in its removed position in FIG. 3, has a right triangular shape with a notch 20 on the side opposite the right angle apex 16. Protective plate 15 is screwed onto side guiding plate 12, in a position such that at the top it extends the dihedral formed by the cantilever of side guiding plate 12, so that apex 16 of said protective plate 15 covers the end of inlet 13 in side guiding plate 12, leaving said inlet 13 partially uncovered, thanks to notch 20, to allow the passage of milling cutter 11 mounted in milling shaft 4 when motor body 2 is in the inclined position.

Figure 1:
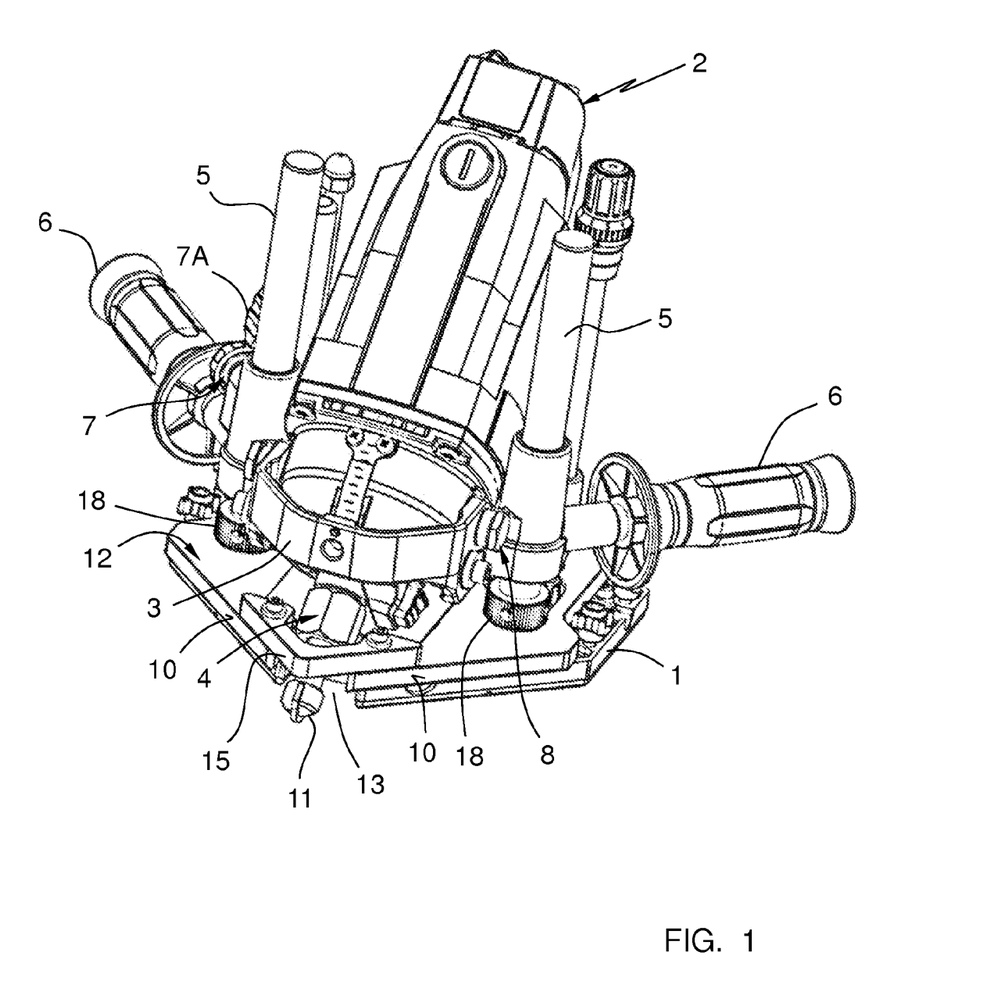
FIG. 1 is a front perspective view of the hand router according to the invention, with the motor body in the inclined position.
Figure 2:
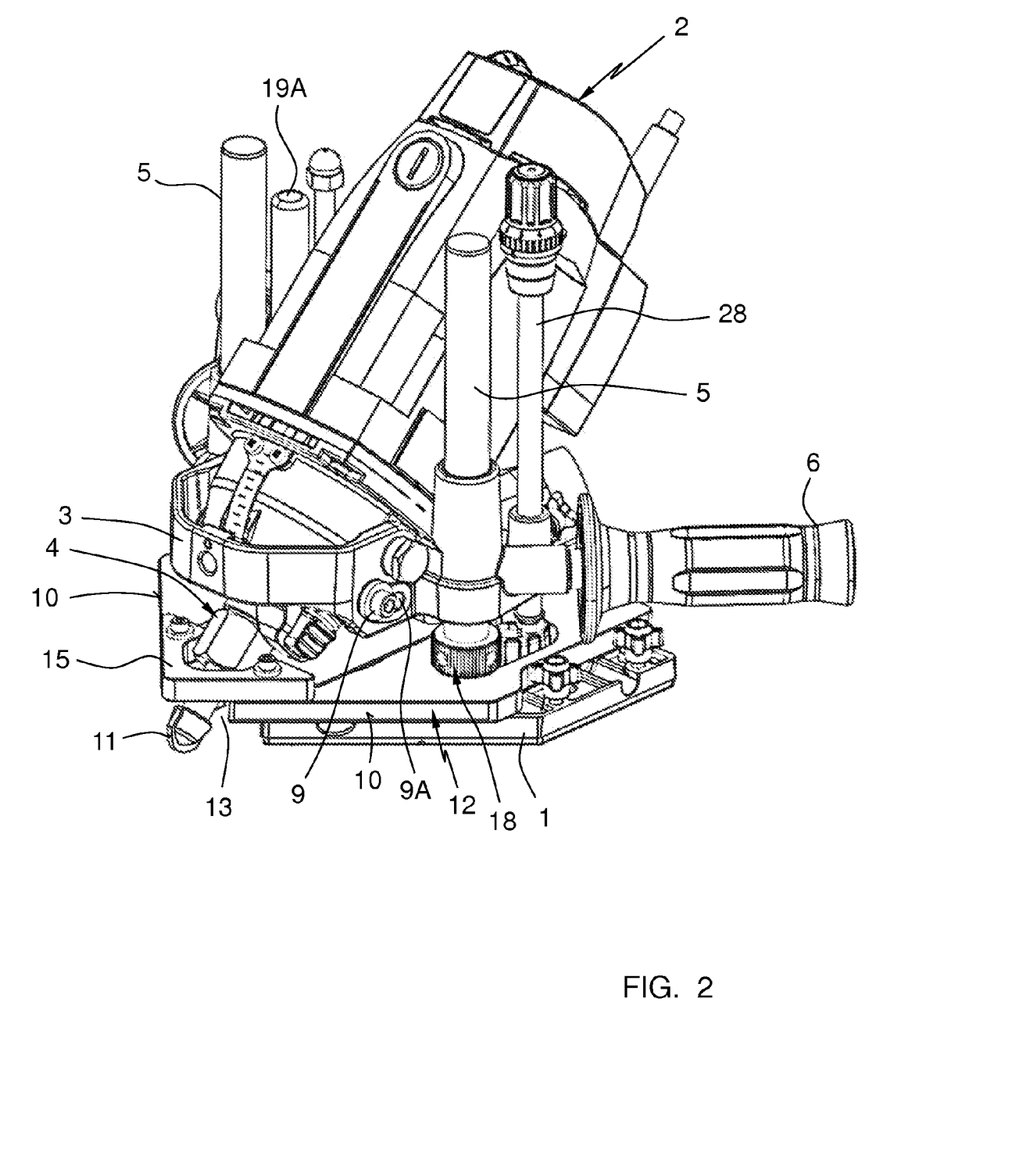
FIG. 2 is a side perspective view corresponding to the arrangement in FIG. 1.
Figure 3:
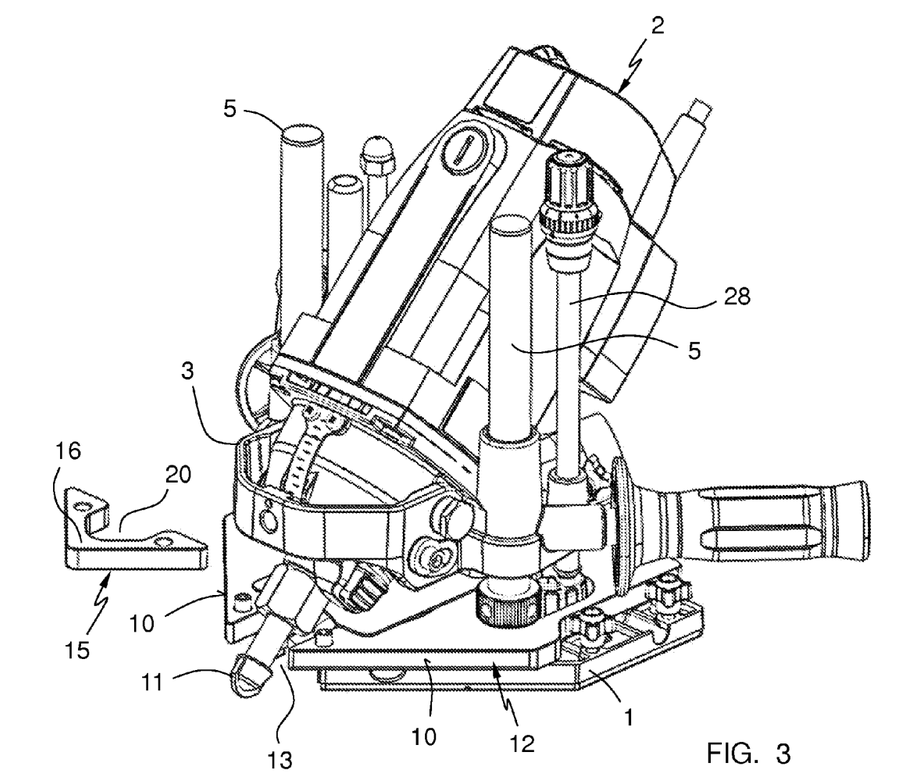
FIG. 3 is an identical view to the one in FIG. 2, wherein the protective plate appears withdrawn.
Figure 4:
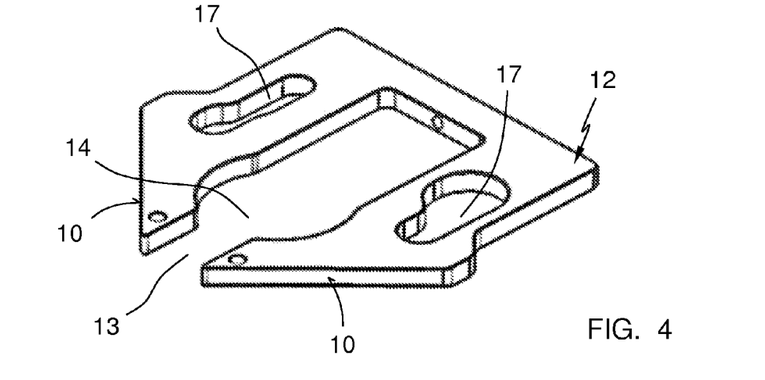
FIG. 4 is a perspective view of the side guiding plate.
Figure 5:
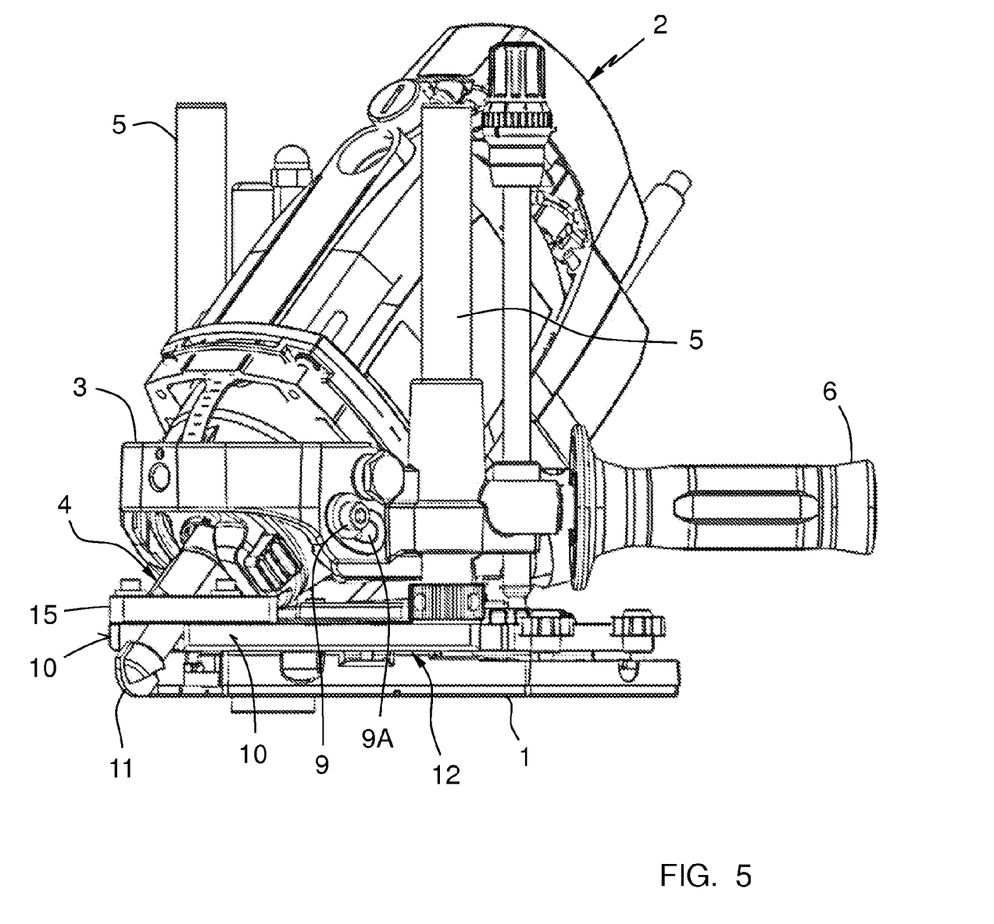
FIG. 5 is a profile view corresponding to the arrangement in FIG. 1.
Figure 6:
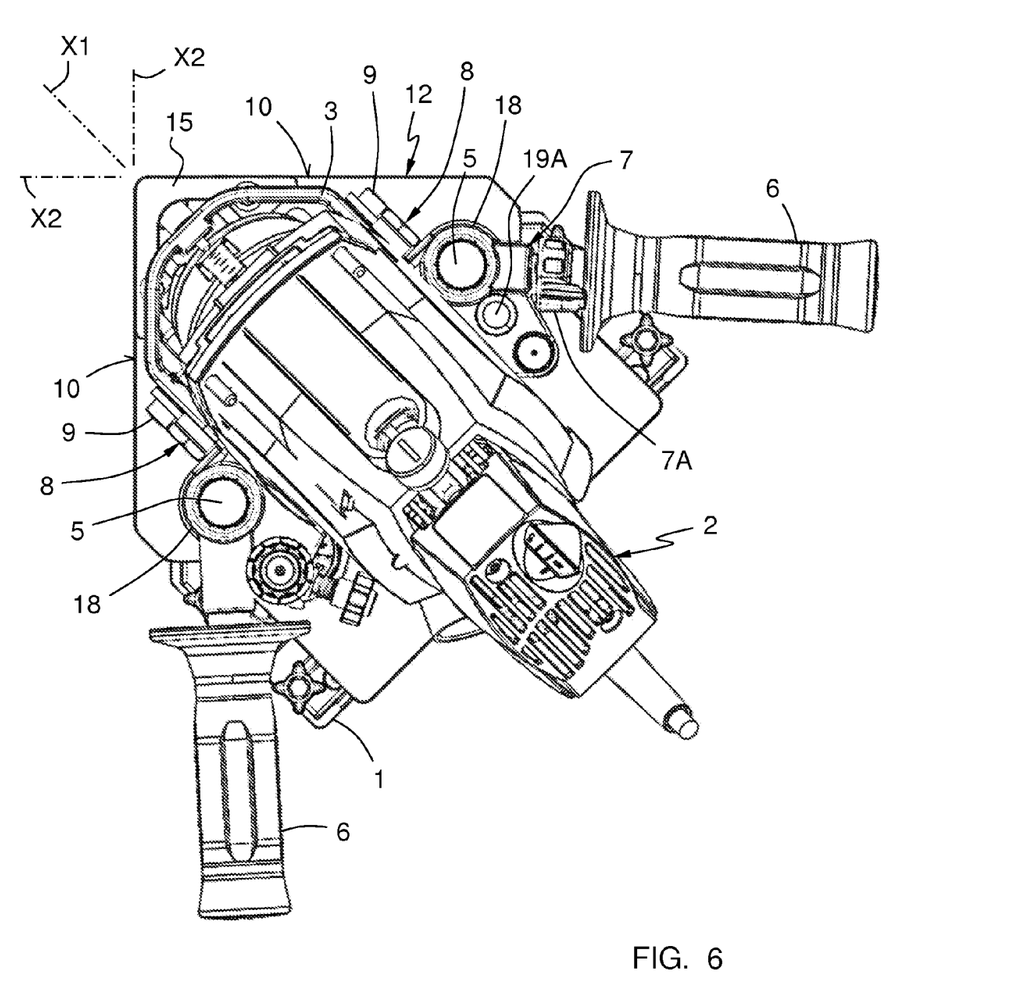
FIG. 6 is a top view corresponding to the arrangement in FIG. 1.
Figure 7:
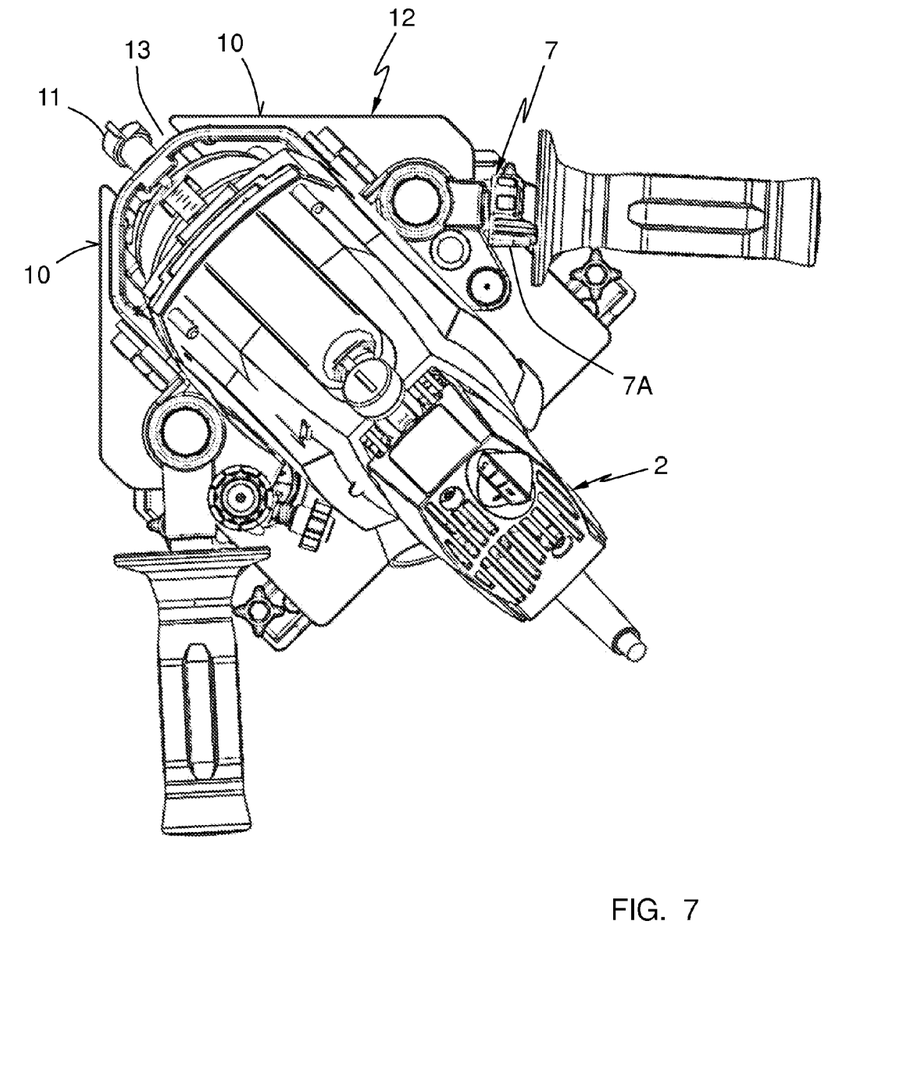
FIG. 7 is an identical view to the one in FIG. 6, without the protective plate.
Figure 8:
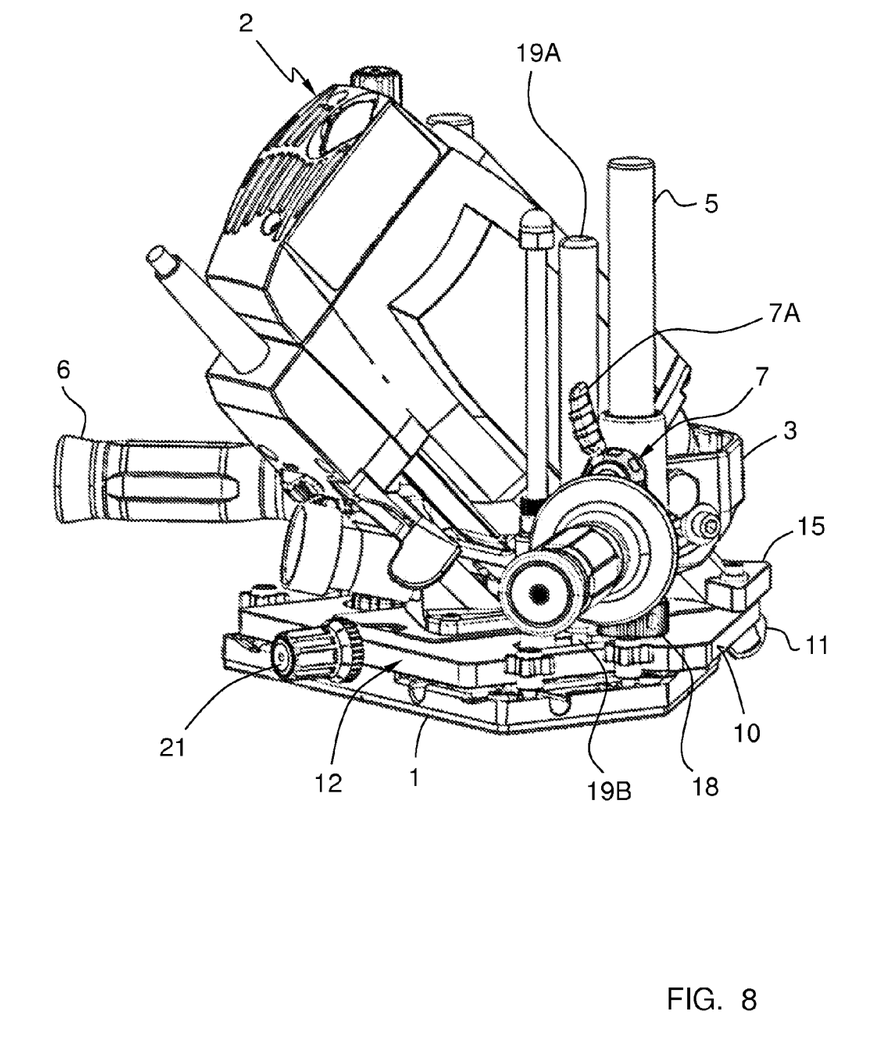
FIG. 8 is a side rear perspective view corresponding to the arrangement in FIG. 1.

In order to perform the radial-shaped routing of a horizontal intersection corner like the one in FIG. 10, the router is fitted with side guiding plate 12 and with protective plate 15 and motor body 2 is arranged in the 45° inclined position shown in FIGS. 1 to 8. The vertical position of milling cutter 11 is adjusted so that the cutting edge of said milling cutter 11 is placed horizontally flush with the worktop surface (which is coplanar to the bottom surface of base plate 1). This position corresponds to that in FIG. 5 (although the worktop is not shown in the drawing). The user acts upon locking lever 7A to release and again lock the vertical sliding movement of frame 3. The vertical position of milling cutter 11 can be adjusted more accurately using fine adjustment means that are comprised in the router and which are not described herein, since they are not relevant to the claimed invention and the embodiment thereof is within the scope of a person skilled in the art. On the other hand, the relative position of side guiding plate 12 with respect to base plate 1 is also adjusted, so that the cutting edge of milling cutter 11 remains vertically flush with the plane of one of the side guiding edges 10 (whereby it remains flush with the plane of the other side guiding edge 10). This position, which also corresponds to the one in FIG. 5, is illustrated more clearly in FIG. 7. Since side guiding edges 10 do not reach the vertical of milling cutter 11, since the apex of side guiding plate 12 is truncated by inlet 13, the cutting edge of milling cutter 11 can be adjusted by using a straight ruler on level with one of the side guiding edges 10. In order to adjust the position of side guiding plate 12, the user loosens wing nuts 18 and acts upon handle 21 which activates movement means of said side guiding plate 12 (not visible in the drawings). Finally protective plate 15 is attached above side guiding plate 12 using screws.

Once these preparation and adjustment operations have been completed, the router can be used to comfortably and accurately perform a radial-shaped finishing on the horizontal intersection corner 24 between a trim 23A and a worktop 22, obtaining the result illustrated in FIG. 10. To this end, the router is positioned resting with bottom surface of its base plate 1 on worktop 22 and the router is slid along trim 23A while always keeping side guiding edge 10 applied against said trim 23A.

In order to perform a radial-shaped finishing on the vertical intersection corner 24 between trims 23A, 23B and a worktop 22, as shown in FIG. 11, the same arrangement is used as in the previous case, but the router is held so that both side guiding edges 10 remain applied against a trim 23A, 23B, whereby milling cutter 11 remains perfectly centered in vertical intersection corner 25. The routing is performed by applying a vertical movement to frame 3. Thanks to gas damper 19A, 19B, the user can lead this vertical movement of frame 3 in a gentle, progressive way without the heavy weight of motor body 2 affecting it.

The router can also be used comfortably to carry out the actual tasks of a conventional hand surface router, such as for example routing outer edges, routing by copying, undercutting or etching surfaces, etc. In order to move to the surface router arrangement, frame 3 is rotated so that motor body 2 lies vertically, as shown in FIG. 9, and frame 3 is locked in this position. The vertical position of the router is adjusted in a similar way to that explained above, and the depth of the vertical stroke of the router is also adjusted by means of rod 28. The operation of this rod 28 is not described herein because it is in the scope of a person skilled in the art and is not a relevant part of the invention. Base plate 1 comprises coupling means, such as transverse channels, threaded holes and tightening screws, which make it possible to attach various auxiliary devices to said base plate 1 for specific routing tasks. FIG. 9 illustrates, among the various possible arrangements, one that is used to shape the outer edges of the worktop: base plate 1 carries parallel guiding rods 26 fitted with a support device 27 intended to be applied against the edge of the worktop. Other auxiliary devices (not shown) that can be attached to base plate 1 are, for example, guide-templates for performing copied routing operations and rail-guides for performing parallel cuts.

While specific embodiments of the invention have been shown and described in detail to illustrate the application of the principles of the invention, it will be understood that the invention may be embodied otherwise without departing from such principles.

What is claimed is:

1. A versatile hand router, comprising:
a base plate suitable for being applied to a flat surface;
a motor body attached to a frame and having a milling shaft and hand gripping means, with said motor body being attached to said frame by a pivoting link that allows said motor body to pivot with respect to said frame, in a pivoting plane orthogonal to the plane of said base plate, between a vertical position and at least one inclined position, wherein said milling shaft is orthogonal to the plane of said base plate in said vertical position and said milling shaft is inclined with respect to the plane of said base plate in said at least one inclined position;
a pivoting locking means for selectively fixing the inclined position of said motor body;
at least one side guiding edge comprised in an inclined plane with respect to said pivoting plane and which extends in a cantilever arrangement and above said base plate, such that a milling cutter mounted on said milling shaft can be positioned under said side guiding edge when said motor body is in the inclined position;
a supporting-guide means for supporting said frame such that, while maintaining an inclined position fixed by said pivoting locking means, said frame can slide in a vertical direction, orthogonal to the plane of said base plate; and
vertical locking means for selectively fixing the vertical position of said frame.

2. A hand router according to claim 1, wherein two of said side guiding edges are formed in a side guiding plate that is fixed solidly to said base plate and which has a cantilever with respect to said base plate, said cantilever forming a dihedral centered in said pivoting plane and orthogonal to the plane of said base plate, so that the sides of said cantilever form said two side guiding edges.

3. A hand router according to claim 2, wherein said side guiding plate has an inlet that truncates the apex of said dihedral formed by said cantilever to allow the passage of said milling cutter mounted in the milling shaft when said motor body is in the inclined position.

4. A hand router according to claim 3, wherein said side guiding plate extends over the top surface of said base plate and has a wide opening to allow the passage of said milling cutter mounted in the milling shaft when said motor body is in the vertical position.

5. A hand router according to claim 4, wherein said wide opening is formed as an extension of said inlet, with both forming one and the same hole.

6. A hand router according to claim 1, further comprising:
hydraulic damping means for applying a return force to said frame that pushes said frame away from said base plate in the vertical direction, orthogonal to the plane of said base plate.

7. A hand router according to claim 2, further comprising:
a protective plate removably mounted above on said side guiding plate, extending at the top said dihedral formed by the cantilever of said side guiding plate, with said protective plate having an apex that covers the end of an inlet of said side guiding plate, leaving said inlet partially uncovered to allow the passage of said milling cutter mounted in milling shaft when said motor body is in the inclined position.

8. A hand router according to claim 2, further comprising:
hydraulic damping means for applying a return force to said frame that pushes said frame away from said base plate in the vertical direction, orthogonal to the plane of said base plate.

9. A hand router according to claim 3, further comprising:
hydraulic damping means for applying a return force to said frame that pushes said frame away from said base plate in the vertical direction, orthogonal to the plane of said base plate.

10. A hand router according to claim 4, further comprising:
hydraulic damping means for applying a return force to said frame that pushes said frame away from said base plate in the vertical direction, orthogonal to the plane of said base plate.

11. A hand router according to claim 5, further comprising:
hydraulic damping means for applying a return force to said frame that pushes said frame away from said base plate in the vertical direction, orthogonal to the plane of said base plate.

12. A hand router according to claim 3, further comprising:
a protective plate that is removably mounted above on said side guiding plate, extending at the top said dihedral formed by the cantilever of said side guiding plate, with said protective plate having an apex that covers the end of said inlet of side guiding plate, leaving said inlet partially uncovered to allow the passage of said milling cutter mounted in milling shaft when said motor body is in the inclined position.

13. A hand router according to claim 4, further comprising:
a protective plate that is removably mounted above on said side guiding plate, extending at the top said dihedral formed by the cantilever of said side guiding plate, with said protective plate having an apex that covers the end of said inlet of said side guiding plate, leaving said inlet partially uncovered to allow the passage of said milling cutter mounted in milling shaft when said motor body is in the inclined position.

14. A hand router according to claim 5, further comprising:
a protective plate that is removably mounted above on said side guiding plate, extending at the top said dihedral formed by the cantilever of said side guiding plate, with said protective plate having an apex that covers the end of said inlet of side guiding plate, leaving said inlet partially uncovered to allow the passage of said milling cutter mounted in said milling shaft when said motor body is in the inclined position.

15. A hand router according to claim 6, further comprising:
a protective plate that is removably mounted above on said side guiding plate, extending at the top said dihedral formed by the cantilever of said side guiding plate, with said protective plate having an apex that covers the end of said inlet of side guiding plate, leaving said inlet partially uncovered to allow the passage of said milling cutter mounted in said milling shaft when said motor body is in the inclined position.

16. A versatile hand router, comprising:
a base plate;
a frame;
a motor body;
a pivotable link connected to said motor body and said frame, said motor body pivotably connected to said frame via said pivotable link such that said motor body pivots, with respect to said frame, between a vertical position and at least one inclined position in a pivoting plane orthogonal to said base plate, said motor body comprising a milling shaft, wherein said milling shaft is perpendicular to said base plate in said vertical position and said milling shaft is inclined with respect to said base plate in said at least one inclined position;
a milling cutter connected to said milling shaft;
a pivoting locking means for selectively fixing said motor body in said inclined position;
a supporting-guide means for supporting said frame such that said frame is movable in a vertical direction, orthogonal to said base plate with said motor body being fixed in said at least one inclined position via said pivoting locking means, said motor body being pivotable relative to said supporting-guide means via said pivotable link; and
a vertical locking means for selectively fixing a vertical position of said frame.

17. A hand router according to claim 16, further comprising:
a side guiding plate, wherein two side guiding edges are formed in said side guiding plate, said side guiding plate being fixed to said base plate and having a cantilever with respect to said base plate, said cantilever forming a dihedral centered in a pivoting plane and orthogonal to said base plate, so that sides of said cantilever form said two side guiding edges.

18. A hand router according to claim 17, wherein said side guiding plate has an inlet that truncates the apex of said dihedral formed by said cantilever to allow the passage of said milling cutter mounted in the milling shaft when said motor body is in the inclined position.

19. A hand router according to claim 18, wherein said side guiding plate extends over a top surface of said base plate and has a wide opening to allow the passage of said milling cutter mounted in the milling shaft when said motor body is in the vertical position.

20. A hand router according to claim 16, further comprising:
a hydraulic damping means for applying a return force to said frame that pushes said frame away from said base plate in the vertical direction, orthogonal to said base plate.

* * * * *